(12) United States Patent
Tagami et al.

(10) Patent No.: US 11,056,688 B2
(45) Date of Patent: Jul. 6, 2021

(54) LITHIUM COMPOUND, METHOD FOR PRODUCING THE LITHIUM COMPOUND, AND METHOD FOR PRODUCING POSITIVE ACTIVE MATERIAL FOR NONAQUEOUS ELECTROLYTE SECONDARY BATTERY

(71) Applicant: SUMITOMO METAL MINING CO., LTD., Tokyo (JP)

(72) Inventors: Azusa Tagami, Niihama (JP); Takeshi Asakawa, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/308,065

(22) PCT Filed: Jun. 6, 2017

(86) PCT No.: PCT/JP2017/020910
§ 371 (c)(1),
(2) Date: Dec. 7, 2018

(87) PCT Pub. No.: WO2017/213112
PCT Pub. Date: Dec. 14, 2017

(65) Prior Publication Data
US 2019/0312273 A1  Oct. 10, 2019

(30) Foreign Application Priority Data
Jun. 7, 2016  (JP) .............................. JP2016-113196

(51) Int. Cl.
| | |
|---|---|
| *B03C 1/00* | (2006.01) |
| *B03C 1/02* | (2006.01) |
| *H01M 4/525* | (2010.01) |
| *C01D 15/02* | (2006.01) |
| *C01G 53/00* | (2006.01) |
| *C01D 1/28* | (2006.01) |
| *H01M 4/02* | (2006.01) |

(52) U.S. Cl.
CPC ............... *H01M 4/525* (2013.01); *B03C 1/00* (2013.01); *B03C 1/002* (2013.01); *B03C 1/02* (2013.01); *C01D 1/28* (2013.01); *C01D 15/02* (2013.01); *C01G 53/42* (2013.01); *B03C 2201/20* (2013.01); *C01P 2006/40* (2013.01); *C01P 2006/80* (2013.01); *H01M 2004/028* (2013.01)

(58) Field of Classification Search
CPC ...... H01M 4/362; H01M 4/483; H01M 10/05; B03C 1/00; B03C 1/002; B03C 2201/20
USPC ................................................. 429/112, 223
See application file for complete search history.

(56) References Cited

U.S. PATENT DOCUMENTS

| | | | | |
|---|---|---|---|---|
| 2003/0199596 A1* | 10/2003 | Koike | ..................... | B29B 17/00 521/40 |
| 2011/0020704 A1* | 1/2011 | Fukuchi | ................ | H01M 4/362 429/223 |
| 2011/0318624 A1* | 12/2011 | Swift | .................... | H01M 4/483 429/112 |
| 2014/0010752 A1* | 1/2014 | Kagei | ................... | C01G 45/12 423/594.15 |

FOREIGN PATENT DOCUMENTS

| | | | | |
|---|---|---|---|---|
| CN | 103884571 | * | 6/2014 | ............... G01N 1/34 |
| JP | 2002-358952 A | * | 12/2002 | ............ H01M 10/05 |

* cited by examiner

*Primary Examiner* — Khanh T Nguyen
(74) *Attorney, Agent, or Firm* — Kratz, Quintos & Hanson, LLP

(57) ABSTRACT

A lithium compound with which a positive active material containing a decreased amount of magnetically attractable substances can be easily obtained while shortening the total time for production of a positive electrode for a nonaqueous electrolyte secondary battery. The lithium compound is used for producing a positive active material for a nonaqueous electrolyte secondary battery, with which a lithium transition metal composite oxide can be obtained by mixing the lithium compound with a transition metal composite hydroxide or the like obtained by crystallization reaction. A positive active material in which the amount of magnetically attractable substances contained is 0.02 mass ppm or less can be easily obtained while shortening the total time for production of the positive active material.

3 Claims, 1 Drawing Sheet

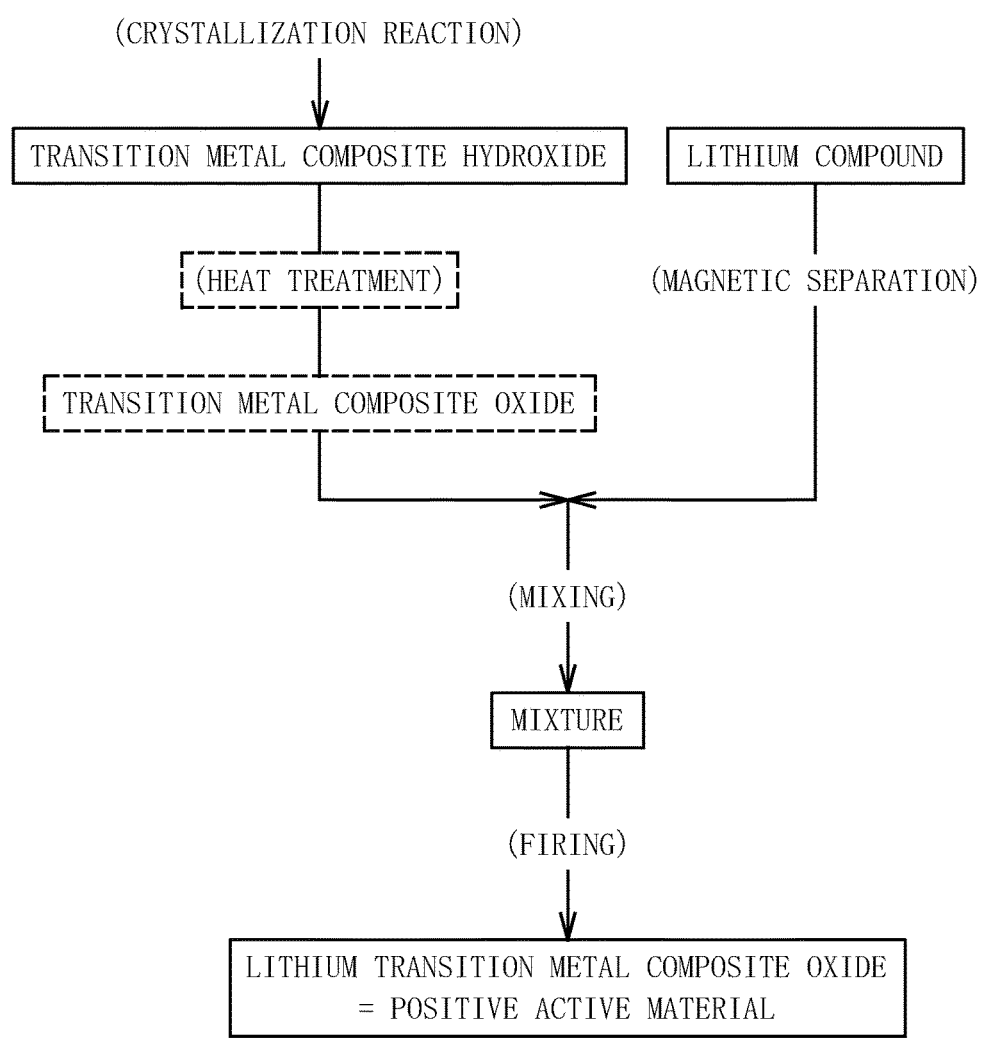

LITHIUM COMPOUND, METHOD FOR PRODUCING THE LITHIUM COMPOUND, AND METHOD FOR PRODUCING POSITIVE ACTIVE MATERIAL FOR NONAQUEOUS ELECTROLYTE SECONDARY BATTERY

TECHNICAL FIELD

The present invention relates to a lithium compound, a method for producing the lithium compound, and a method for producing a positive active material for a nonaqueous electrolyte secondary battery. More specifically, the present invention relates to a lithium compound, whereby the amount of magnetically attractable substances in the lithium compound is kept within a fixed range, a method for producing the lithium compound, and a method for producing a positive active material for a nonaqueous electrolyte secondary battery.

BACKGROUND ART

In recent years, the demand of nonaqueous electrolyte secondary batteries as chargeable and dischargeable power supplies is sharply increasing as the rapid expansion of the spread of small electronic equipment such as cellular phones and notebook personal computers. As such nonaqueous electrolyte secondary batteries, lithium secondary batteries are attracting attention because of their small size, light weight, and high energy density.

A lithium secondary battery is composed of a negative electrode, a positive electrode, an electrolytic solution, and the like, wherein materials capable of eliminating and inserting lithium are used as negative active materials and positive active materials.

For example, a lithium-cobalt composite oxide ($LiCoO_2$), which can be relatively easily synthesized, a lithium-nickel composite oxide ($LiNiO_2$), for which nickel that is cheaper than cobalt is used, or a lithium manganese composite oxide ($LiMn_2O_4$), in which manganese is used, can be used for a positive active material for a lithium secondary battery.

A positive active material of a lithium secondary battery is produced by mixing a "lithium compound" serving as a lithium source, such as a lithium hydroxide with a "metal compound" such as a hydroxide, a carbonate, and an oxide, so as to be generated from a mixture of this "lithium compound" and "metal compound".

A positive electrode of a battery is generally produced by applying a slurry containing a positive active material and a binder to a charge collector. Here, the positive active material contains metal powder such as iron powder and stainless steel (SUS) powder, which are derived from raw materials or mixed therein in the production steps. Such metal powder may cause micro-shorting. If such a micro-shorting takes place, the resulting battery capacity is significantly lowered and at worst, the battery loses its functions as a battery. Hence, it is essential to reduce the amount of magnetically attractable substances that are metal powders in the positive active material. However, the prolonged processing time for a step of removing magnetically attractable substances is problematic in that it increases the time for the whole steps and the production cost for the positive active material.

Here, Patent Literature 1 (Japanese Unexamined Patent Publication No. 2009-164062) discloses that the content of magnetically attractable substances in the coating material of a positive electrode combination agent is 0.02 ppm or less so that problems of internal short and under voltage failure can be solved. Theoretically, the content of magnetically attractable substances in each material for generating the coating material of a positive electrode combination agent is 0.02 ppm or less, so that the content of the magnetically attractable substances can be 0.02 ppm or less in the coating material of the positive electrode combination agent. Specifically, regarding a positive active material that is one of materials for generating the coating material of a positive electrode combination agent, the amount of magnetically attractable substances contained in the positive active material alone should be an amount corresponding to 0.02 ppm. Methods for reducing the amount of magnetically attractable substances within the positive active material are disclosed in literature such as the following.

First, Patent Literature 2 (Japanese Unexamined Patent Publication No. 2005-15282) discloses a method for adsorbing and removing contained metal powder via magnetic attraction prior to a stage of generating a coprecipitate composed of a transition metal and a substitutional metal of any one of manganese, nickel, and cobalt. Such a coprecipitate is the above "metal compound". When a coprecipitate and a lithium compound is mixed and fired, a substitutional lithium transition metal composite oxide is generated. It is considered that a lithium secondary battery with a high cycle retention rate can be provided by the production method according to this literature. This literature further discloses that when a coprecipitate and a lithium compound are wet-mixed, a procedure of applying a magnetic field is further performed using a wet magnetic separator.

This literature is problematic in that the processing time for the whole steps is prolonged, since a metal compound and a lithium compound are mixed, and then the thus increased amount of the mixture is subjected to a wet magnetic separator, requiring an addition of a step of drying such an increased amount of the mixture.

Next, Patent Literature 3 (Japanese Unexamined Patent Publication No. 2003-119026) describes a method for producing a lithium transition metal composite oxide, whereby metal as foreign matter is removed by causing a lithium compound and a mixture containing a transition metal compound (corresponding to the above "metal compound") to pass through a predetermined magnetic field at a raw-material stage before synthesis of a lithium transition metal composite oxide. This literature states that specifying the intensity of a magnetic field for raw materials to pass through at a predetermined level enables to prevent mixing of iron into battery materials, and further enables to prevent mixing of SUS powder into battery materials.

In this literature, there is a problem such that a lithium compound and a metal compound are separately, or a mixture prepared by mixing a lithium compound with a mixture containing a transition metal compound, is subjected to wet magnetic separation, so that a step such as a drying step is required after magnetic separation, resulting in a prolonged processing time for the whole steps. In particular, a mixture prepared by mixing a lithium compound and a metal compound is problematic in that the processing time of such a drying step after the amount of the mixture is increased is prolonged.

Moreover, Patent Literature 4 (Japanese Unexamined Patent Publication No. 2015-60755) specifically describes a method for producing a positive active material for a lithium ion secondary battery, wherein magnetic components contained in a positive active material for a lithium ion secondary battery can be efficiently removed, confirming that the total Fe concentration in raw materials decreases from 40 ppm to less than 20 ppm after being passed through a wet electromagnet.

However, there is also a problem in this literature such that since a mixture prepared by mixing a lithium compound and a metal compound is subjected to wet magnetic separation, the processing time of the drying step is prolonged after the amount of the mixture is increased.

CITATION LIST

Patent Literature

Patent Literature 1: Japanese Unexamined Patent Publication No. 2009-164062
Patent Literature 2: Japanese Unexamined Patent Publication No. 2005-15282
Patent Literature 3: Japanese Unexamined Patent Publication No. 2003-119026
Patent Literature 4: Japanese Unexamined Patent Publication No. 2015-60755

SUMMARY OF INVENTION

Technical Problem

In view of the above circumstances, an object of the present invention is to provide a lithium compound, with which a positive active material capable of reducing the amount of magnetically attractable substances to be contained can be easily obtained while shortening the total production time for producing the positive active material for a nonaqueous electrolyte secondary battery, a method for producing the lithium compound, and a method for producing a positive active material for a nonaqueous electrolyte secondary battery using the lithium compound.

Solution to Problem

As a result of intensive studies on magnetically attractable substances to be mixed into a positive active material to achieve the above object, the present inventor has obtained a finding that when a positive active material is produced using a transition metal composite hydroxide obtained by crystallization reaction, magnetically attractable substances to be mixed in the positive active material come from mainly the lithium compound, and thus through the use of a lithium compound containing a reduced amount of magnetically attractable substances, a positive active material, into which a decreased amount of magnetically attractable substances is mixed, can be easily obtained. Thus, the present inventor has completed the present invention.

The lithium compound of a $1^{st}$ invention is a lithium compound to be used for production of a positive active material for a nonaqueous electrolyte secondary battery, with which a lithium transition metal composite oxide can be obtained by mixing the lithium compound with a transition metal composite hydroxide obtained by crystallization reaction, or a transition metal composite oxide obtained by heat treatment of the transition metal composite hydroxide, and then firing the thus obtained mixture, wherein when water, and a magnet having a magnetic flux density of 0.9 tesla are added to and mixed with the lithium compound, and then the mixture is stirred for 30 minutes, the amount of magnetically attractable substances to be captured by the magnet is 0.0007 mass % or less with respect to the amount of lithium contained in the lithium compound.

The lithium compound of a $2^{nd}$ invention is the lithium compound of the $1^{st}$ invention, wherein the lithium compound is any one of a lithium hydroxide, a hydrate of a lithium hydroxide, and a mixture of a lithium hydroxide and a hydrate thereof.

The lithium compound of a $3^{rd}$ invention is the lithium compound of the $1^{st}$ invention or the $2^{nd}$ invention, wherein the amount of magnetically attractable substances is 0.0005 mass % or less with respect to the amount of lithium contained in the lithium compound.

The lithium compound of a $4^{th}$ invention is the lithium compound of any one of the $1^{st}$ invention to the $3^{rd}$ invention, wherein the amount of magnetically attractable substances is calculated by cleaning the magnet with water by ultrasonic cleaning, dissolving magnetically attractable substances adhered to the surface by acid, and then performing chemical analysis.

The method of a $5^{th}$ invention for producing a lithium compound is a method for producing a lithium compound for production of a positive active material for a nonaqueous electrolyte secondary battery, whereby the amount of magnetically attractable substances in the lithium compound is 0.0007 mass % or less with respect to the amount of lithium contained in the lithium compound through the contact of a magnetized screen with the lithium compound and the use of a magnetic separator for removing magnetically attractable substances.

The method of a $6^{th}$ invention for producing a lithium compound is the method of the $5^{th}$ invention for producing a lithium compound, wherein the lithium compound is subjected to dry magnetic separation.

The method of a $7^{th}$ invention for producing a lithium compound is the method of the $5^{th}$ invention or the $6^{th}$ invention for producing a lithium compound, wherein the magnetic flux density of the surface of the screen is 1 tesla or more.

The method of an $8^{th}$ invention for producing a positive active material for a nonaqueous electrolyte secondary battery includes mixing the lithium compound of any one of the $1^{st}$ invention to the $4^{th}$ invention with a transition metal composite hydroxide obtained by crystallization reaction, and then firing the thus obtained mixture.

The method of a $9^{th}$ invention for producing a positive active material for a nonaqueous electrolyte secondary battery includes mixing the lithium compound of any one of the $1^{st}$ invention to the $4^{th}$ invention with a transition metal composite oxide obtained by heat treatment of a transition metal composite hydroxide obtained by crystallization reaction, and then firing the thus obtained mixture.

The method of a $10^{th}$ invention for producing a positive active material for a nonaqueous electrolyte secondary battery is the method of the $8^{th}$ invention or the $9^{th}$ invention for producing a positive active material for a nonaqueous electrolyte secondary battery, wherein the amount of magnetically attractable substances in the mixture is 0.02 mass ppm or less.

Advantageous Effects of Invention

According to the $1^{st}$ invention, through the use of a lithium compound characterized in that when water and a magnet having a magnetic flux density of 0.9 tesla are added to and mixed with the lithium compound, and then the mixture is stirred for 30 minutes, the amount of magnetically attractable substances to be captured by the magnet is 0.0007 mass % or less with respect to the amount of lithium contained in the lithium compound, the amount of magnetically attractable substances in the thus produced positive active material can be 0.02 mass ppm or less with respect to the positive active material containing the magnetically attractable substances. Specifically, such a positive active material containing the decreased amount of magnetically attractable substances can be obtained while shortening the total time for production of the positive active material for a nonaqueous electrolyte secondary battery.

According to the $2^{nd}$ invention, the lithium compound is any one of a lithium hydroxide, a hydrate of a lithium hydroxide, and a mixture of a lithium hydroxide and a hydrate thereof, so that the lithium hydroxide can increase the reactivity with a composite hydroxide or a composite oxide, since the lithium hydroxide has a low melting temperature, and thus has a characteristic of being melted during firing.

According to the $3^{rd}$ invention, the amount of magnetically attractable substances is 0.0005 mass % or less with respect to the amount of lithium contained in the lithium compound, so that the amount of magnetically attractable substances in a positive active material produced using the lithium compound can be more definitively and effectively kept at 0.02 mass ppm or less with respect to the amount of the positive active material containing the magnetically attractable substances.

According to the $4^{th}$ invention, the amount of magnetically attractable substances is calculated by cleaning with water a magnet mixed and stirred with a lithium compound by ultrasonic cleaning, dissolving magnetically attractable substances adhered to the surface by acid, and then performing chemical analysis. Hence, the amount of magnetically attractable substances in the lithium compound can be specified by a simple method.

According to the $5^{th}$ invention, the amount of magnetically attractable substances in the lithium compound is 0.0007 mass % or less with respect to the amount of lithium contained in the lithium compound as a result of bringing a magnetized screen into contact with the lithium compound and using a magnetic separator for removing magnetically attractable substances. As a result, the amount of magnetically attractable substances in a positive active material produced using the thus produced lithium compound can be 0.02 mass ppm or less with respect to the positive active material containing the magnetically attractable substances. Specifically, such a positive active material containing the decreased amount of magnetically attractable substances can be obtained and while shortening the total time for production of a positive active material for a nonaqueous electrolyte secondary battery.

According to the $6^{th}$ invention, the lithium compound is subjected to dry magnetic separation, resulting in no loss due to dissolution of a water-soluble lithium compound, and no requirement of a drying step after magnetic separation, so as to be able to simplify the step, compared with a case of using water as a solvent.

According to the $7^{th}$ invention, the magnetic flux density of the surface of the screen is 1 tesla or more, so that magnetically attractable substances can be definitely captured, and the amount of magnetically attractable substances can be easily reduced to 0.0007 mass % or less.

According to the $8^{th}$ invention, the method for producing a positive active material for a nonaqueous electrolyte secondary battery includes mixing the lithium compound containing the reduced amount of magnetically attractable substances with a transition metal composite hydroxide obtained by crystallization reaction, and then firing the thus obtained mixture, whereby the positive active material containing the decreased amount of magnetically attractable substances can be easily obtained while shortening the total time for production of the positive active material for a nonaqueous electrolyte secondary battery.

According to the $9^{th}$ invention, the method for producing a positive active material for a nonaqueous electrolyte secondary battery includes mixing the lithium compound containing the reduced amount of magnetically attractable substances with a transition metal composite oxide obtained by heat treatment of a transition metal composite hydroxide obtained by crystallization reaction, and then firing the thus obtained mixture, whereby a positive active material containing the decreased amount of magnetically attractable substances can be easily obtained while shortening the total time for production of the positive active material for a nonaqueous electrolyte secondary battery.

According to the $10^{th}$ invention, the amount of magnetically attractable substances in the mixture is 0.02 mass ppm or less, whereby when the thus produced positive active material is used for a battery, micro-shorting can be prevented.

BRIEF DESCRIPTION OF DRAWINGS

FIG. 1 is a flow diagram of a method for producing a positive active material for a nonaqueous electrolyte secondary battery.

DESCRIPTION OF EMBODIMENTS

The lithium compound of the present invention to be used for producing a positive active material for a nonaqueous electrolyte secondary battery is a lithium compound, with which a lithium transition metal composite oxide can be obtained by mixing the lithium compound with a transition metal composite hydroxide obtained by crystallization reaction, or a transition metal composite oxide obtained by heat treatment of the transition metal composite hydroxide, and then firing the thus obtained mixture, wherein when water and a magnet having a magnetic flux density of 0.9 tesla are added to and mixed with the lithium compound and then the mixture is stirred for 30 minutes, the amount of magnetically attractable substances to be captured by the magnet is 0.0007 mass % or less with respect to the amount of lithium contained in the lithium compound.

A positive active material for a nonaqueous electrolyte secondary battery (hereinafter, may simply be referred to as "positive active material") is subjected to magnetic separation to remove magnetically attractable substances in order to reduce the amount of magnetically attractable substances contained in the positive active material. Magnetically attractable substances in a positive active material may be sintered together with the positive active material or incorporated within aggregated particles of the positive active material. Hence, it is difficult to easily reduce the amount of magnetically attractable substances after formation of the positive active material. Furthermore, as a general method for removing magnetically attractable substances, wet removal is known to be more efficient than dry removal. However, upon production of a positive active material, a wet step is not always provided after formation of the positive active material. This may lead to a case where wet removal of magnetically attractable substances is difficult. Accordingly, it is important to reduce the amount of magnetically attractable substances in advance at a stage(s) where raw materials for production of the positive active material are yet to be processed.

FIG. 1 shows a flow chart of a method for producing a positive active material for a nonaqueous electrolyte secondary battery. The steps proceed from the top to the bottom, those within frame lines represent substance names, and those within parentheses represent the names of treatment, and portions indicated with dotted lines indicate that no treatment or the like is performed for the relevant portions. There are many production methods for producing positive active materials. For example, a method that involves mixing a transition metal compound with a lithium compound, and then firing to obtain a lithium transition metal composite compound as a positive active material is generally employed often. Furthermore, there are many types of the transition metal compound, though a transition metal composite hydroxide obtained by crystallization reaction has many advantages such that the particle diameter and the particle size distribution can be relatively easily controlled, and the obtained positive active material has good characteristics.

The present inventor has examined the process of mixing in of magnetically attractable substances in a method for producing a positive active material using the above transition metal composite hydroxide (hereinafter, may also simply be referred to as "composite hydroxide"). As a result, the present inventor has obtained a finding that the amount of magnetically attractable substances contained in a lithium compound used as a raw material has a significant impact, and specifically, when the amount of magnetically attractable substances is high, the amount of magnetically attractable substances contained in the thus obtained positive active material is increased. When the amount of magnetically attractable substances contained in a positive active material is high, it is considered that the incidence of internal short and that of under voltage failure are increased upon industrial scale production of a nonaqueous electrolyte secondary battery (hereinafter, may simply be referred to as "secondary battery"). Hence, it is important to reduce the amount of magnetically attractable substances.

On the other hand, the above transition metal composite hydroxide to be mixed with a lithium compound contains the significantly reduced amount of magnetically attractable substances when it is obtained in the crystallization step. Specifically, major magnetically attractable substances are compounds such as oxides containing Fe, Cr and Zn. However, elements composing these compounds are dissolved in aqueous solutions upon adjustment of aqueous solutions containing transition metals serving as raw materials for composite hydroxides, co-precipitated in composite hydroxides upon crystallization, and thus remain as impurities, but do not exist as magnetically attractable substances. Because of firing with the lithium compound in the subsequent steps, the elements undergo solution treatment in positive active materials, and thus will never bring adverse impact as magnetically attractable substances. Moreover, many undissolved fine compounds such as the above oxides are incorporated into composite hydroxides upon crystallization.

As described above, upon production of a positive active material for a nonaqueous electrolyte secondary battery, by which a transition metal composite hydroxide obtained by crystallization reaction is mixed with a lithium compound, and then the mixture is fired to obtain a lithium transition metal composite oxide, reduction of the amount of magnetically attractable substances contained in the lithium compound is effective for reducing the amount of magnetically attractable substances contained in the positive active material, and a requirement concerning the reduction of the amount of magnetically attractable substances is 0.0007 mass % or less with respect to the amount of lithium contained in the lithium compound. The transition metal composite hydroxide to be mixed with a lithium compound may be subjected to heat treatment and then used as a transition metal composite oxide (hereinafter, may also be simply referred to as "composite oxide") in order to decrease water to be generated upon firing and to improve the crystallinity of a lithium transition metal composite oxide (see FIG. 1).

Here, the term "the amount of magnetically attractable substances" refers to the total amount of Fe, Cr and Zn to be captured by a magnet when water, the magnet having a magnetic flux density of 0.9 tesla, and a lithium compound are mixed and then the mixture is stirred for 30 minutes. The amount of magnetically attractable substances captured by such a magnet can be calculated by, for example, cleaning with water the above magnet after mixing and stirring with the lithium compound by ultrasonic cleaning, dissolving magnetically attractable substances adhered onto the surface with acid, and determining amounts of Fe, Cr and Zn by chemical analysis to find the total amount of the thus determined amounts of these 3 elements as the amount of magnetically attractable substances.

The amount of magnetically attractable substances contained in a lithium compound is 0.0007 mass % or less, preferably 0.0005 mass % or less with respect to the amount of lithium contained in the lithium compound, so that the amount of magnetically attractable substances in the positive active material can be 0.02 mass ppm or less with respect to the positive active material containing magnetically attractable substances.

If the amount of magnetically attractable substances contained in a lithium compound exceeds 0.0007 mass %, upon mixing with a composite hydroxide and firing, elements composing magnetically attractable substances, Fe, Cr and Zn, undergo solution treatment in the lithium transition metal composite oxide composing a positive active material. In this case, the amount of magnetically attractable substances is decreased, but the amount of magnetically attractable substances in the positive active material exceeds 0.02 mass ppm.

The above lithium compound may be a lithium compound with which a lithium transition metal composite oxide can be obtained by mixing and firing. Examples of the lithium compound to be used herein include lithium carbonate, lithium nitrate, lithium hydroxide, lithium chloride, lithium oxalate and the like. An example thereof is preferably a lithium hydroxide, or a hydrate of lithium hydroxide, or a mixture of a lithium hydroxide and a hydrate thereof. Lithium hydroxide has a low melting temperature, is melted during firing, whereby it has high reactivity with a composite hydroxide or a composite oxide (hereinafter, a composite hydroxide and a composite oxide may also be collectively referred to as "composite hydroxide and the like"), and thus is preferably used for production of a positive active material for a nonaqueous electrolyte secondary battery. On the other hand, such lithium hydroxide is melted at a low temperature to permeate into grain boundaries, voids or the like within particles of composite hydroxide and the like, and thus magnetically attractable substances remain outside the particles of composite hydroxide and the like, and the amount of magnetically attractable substances after firing may be higher than that of a lithium compound such as lithium carbonate having a high melting temperature. Accordingly, the amount of magnetically attractable substances is 0.0007 mass % or less, so that the amount of magnetically attractable substances in the positive active material is reduced and lithium hydroxide can be preferably used.

The transition metal composite hydroxide can be obtained by a known neutralization crystallization method using an aqueous solution containing transition metal, and is selected depending on a lithium transition metal composite oxide to be obtained. As the composite hydroxide, in view of the characteristics of a battery using a positive active material, for example, a nickel composite hydroxide represented by general formula (1): $Ni_{1-x}M_x(OH)_2$ (in the formula, M is a transition metal element other than Ni, and is at least one type selected from groups 2, 13, and 14 elements, and $0<x\leq0.5$) is preferably used, and a nickel composite hydroxide represented by general formula (2): $Ni_{1-y-z}M^1_yN_z(OH)_2$ (in the formula, $M^1$ is at least one type selected from Co and Mn, and N is at least one type selected from Al and Ti, and $0.02\leq y\leq0.35$, $0.005\leq z\leq0.05$) is preferably used.

When "y" in general formula (2) is less than 0.02, improvement in cycle characteristics may be insufficient. On the other hand, when "y" exceeds 0.35, battery capacity may decrease. Hence, "y" ranges more preferably from 0.03 to 0.2.

Furthermore, when "z" in general formula (2) is less than 0.005, an effect of improving thermostability may be insufficient, and when "z" exceeds 0.05, battery capacity may decrease. Hence, "z" ranges more preferably from 0.02 to 0.04.

The method for producing a lithium compound to be employed for producing the positive active material for a nonaqueous electrolyte secondary battery of the present invention is a method for producing the above lithium compound, wherein the amount of magnetically attractable substances is 0.0007 mass % or less with respect to the amount of lithium contained in the lithium compound through the contact of a magnetized screen with the lithium compound and then the use of a magnetic separator for removing magnetically attractable substances.

Magnetically attractable substances are mainly composed of compounds such as oxides containing Fe, Cr and Zn, and magnetically attractable substances can be removed by bringing a lithium compound into contact with a magnet. At this time, the amount of magnetically attractable substances need to be reduced to 0.0007 mass % or less with respect to the amount of lithium contained in the lithium compound. When the amount of magnetically attractable substances is reduced insufficiently, the lithium compound is preferably caused to pass through a magnetic separator multiple times. In this manner, magnetically attractable substances are removed until the amount thereof reaches 0.0007 mass % or less.

To facilitate the removal of magnetically attractable substances by a magnetic separator, the particle diameter of a lithium compound from which magnetically attractable substances are removed by the magnetic separator preferably ranges from 1 µm to 50 µm, in terms of a mean particle diameter on the basis of the standard volume obtained by measurement of particle size distribution according to a laser diffraction and scattering method. Accordingly, magnetically attractable substances can be more easily removed by the magnetic separator.

The above lithium compound is preferably subjected to dry magnetic separation. Wet magnetic separation makes it possible to realize a fine particle diameter of powder to be subjected to magnetic separation, and to bring a magnet into contact with the powder in a non-aggregated state. Hence, magnetically attractable substances can be removed more efficiently by wet magnetic separation than by dry magnetic separation. When water is used as a solvent, a water-soluble lithium compound causes loss due to dissolution. Furthermore, a drying step is required after magnetic separation, resulting in lowered productivity. Dry magnetic separation is advantageous since it causes no loss due to dissolution and the steps can be simplified. Note that even in the case of dry magnetic separation, the amount of magnetically attractable substances can be 0.0007 mass % or less.

A screen is magnetized by the electromagnet of the above magnetic separator, but the screen surface preferably has a magnetic flux density of 1 tesla or more. Accordingly, the amount of magnetically attractable substances can be easily reduced to 0.0007 mass % or less. Various forms of magnetic separators are commercially available, and a magnetic separator can be selected and used depending on the throughput or the shape of the powder of a lithium compound.

The method for producing a positive active material for a nonaqueous electrolyte secondary battery of the present invention includes, as shown in FIG. 1, mixing the above lithium compound with a transition metal composite hydroxide obtained by crystallization reaction, and then firing the mixture to obtain a lithium transition metal composite oxide.

Such a lithium compound to be mixed with a composite hydroxide contains magnetically attractable substances at 0.0007 mass % or less, and a lithium transition metal composite oxide is obtained after firing, and thus a positive active material containing magnetically attractable substances in a sufficiently decreased amount, that is, preferably 0.02 mass ppm or less, is obtained.

In order to decrease the amount of water to be generated upon firing as described above and to improve the crystallinity of lithium transition metal composite oxide, a composite hydroxide is subjected to heat treatment to give a transition metal composite oxide, and then the oxide can be mixed with the above lithium compound. Also in this case, the use of the above lithium compound makes it possible to obtain a positive active material in which the amount of magnetically attractable substances is sufficiently reduced.

Regarding the thus obtained positive active material, through selection of a composite hydroxide in view of characteristics upon construction of the battery, for example, as a preferred embodiment, a lithium-nickel composite oxide represented by general formula (3): $Li_sNi_{1-x}MO_2$ (in the formula, M is at least one type selected from a transition metal element other than Ni, and groups 2, 13, and 14 elements, and $0.9\leq s\leq1.2$, $0<x\leq0.5$), and as a more preferred embodiment, a lithium-nickel composite oxide represented by general formula (4): $Li_tNi_{1-y-z}M^1_yN_zO_2$ (in the formula, $M^1$ is at least one type selected from Co and Mn, N is at least one type selected from Al and Ti, and $0.95\leq t\leq1.1$, $0.02\leq y\leq0.35$, $0.005\leq z\leq0.05$) can be obtained, and thus the resultant has excellent battery characteristics, exerts a reduced incidence of internal short and the same of under voltage failure, and leads to high battery productivity.

EXAMPLES

Hereinafter, the present invention will be further described in detail with reference to examples, but the present invention is not limited by these examples.

Amount of Magnetically Attractable Substances

A positive active material (sample, 500 g) obtained in Examples or Comparative example was added to a 1000-ml plastic bottle, and 400 ml of water and a ϕ170×520 mm magnet having a magnetic flux density of 0.9 tesla coated with tetrafluoroethylene were added to the bottle. The bottle was placed on a ball mill rotating stand and then rotated for 30 minutes. Next, the magnet was picked up, placed in a 200-ml beaker, immersed in water, and then cleaned using an ultrasonic cleaner for 10 minutes, thereby removing excess powder adhered to the magnet. Exchanging of ion exchanged water in which the magnet was immersed and cleaning with ultrasonic waves were repeated 3 times. Subsequently, water was removed, aqua regia was added, followed by 20 minutes of heating, so that magnetically attractable substances were dissolved. The magnet was picked up from aqua regia, and aqua regia containing magnetically attractable substances dissolved therein was diluted with water. The thus diluted aqua regia was analyzed by ICP analysis to determine Fe, Cr and Zn, and then the total value of the thus determined values of these 3 elements was designated as the amount of magnetically attractable substances.

Example 1

Magnetically attractable substances were removed using a magnetic separator for magnetic attraction with an electromagnet from lithium hydroxide monohydrate (Li raw material) containing 0.0015 mass % of the magnetically attractable substances with respect to the amount of lithium contained. Conditions for the electromagnet are such that the surface of a screen to be magnetized by the electromagnet had a magnetic flux density of 1.2 tesla, and magnetically attractable substances were adsorbed to the screen via the $\phi$140 mm screen having a slit structure with an aperture of 5 mm. This is specifically described as follows. As a result of performing once a procedure of causing the Li raw material to pass through the screen at a flow rate of 500 kg/h, and removing magnetically attractable substances every 300 kg, the amount of magnetically attractable substances in the Li raw material was decreased to 0.0005 mass % with respect to the amount of lithium contained. The Li raw material and a nickel composite oxide containing magnetically attractable substances at less than 0.015 mass ppm with respect to the nickel composite oxide were used to prepare a positive active material comprising a lithium-nickel composite oxide represented by $Li_{1.01}Ni_{0.82}Co_{0.15}Al_{0.03}O_2$. The amount of magnetically attractable substances in the thus obtained positive active material was measured and found to be less than 0.015 mass ppm.

Example 2

Removal of magnetically attractable substances from a lithium hydroxide monohydrate (Li raw material) containing 0.0025 mass % of magnetically attractable substances with respect to the amount of lithium contained was repeated 3 times in the same manner as in Example 1. As a result, the amount of magnetically attractable substances in the Li raw material was decreased to 0.0002 mass % with respect to the amount of lithium contained. The Li raw material and a nickel composite oxide containing less than 0.015 mass ppm of magnetically attractable substances with respect to the nickel composite oxide were used to prepare a positive active material comprising a lithium-nickel composite oxide represented by $Li_{1.01}Ni_{0.82}Co_{0.15}Al_{0.03}O_2$. The amount of magnetically attractable substances in the thus obtained positive active material was measured and found to be less than 0.015 mass ppm.

Example 3

A Li raw material obtained in the same manner as in Example 1 containing 0.0005 mass % of magnetically attractable substances with respect to the amount of lithium, and, a nickel composite oxide containing 0.028 mass ppm of magnetically attractable substances with respect to the nickel composite oxide were used to prepare a positive active material comprising a lithium-nickel composite oxide represented by $Li_{1.01}Ni_{0.82}Co_{0.15}Al_{0.03}O_2$. The amount of magnetically attractable substances in the thus obtained positive active material was measured and found to be less than 0.015 mass ppm.

Comparative Example 1

Removal of magnetically attractable substances was performed in the same manner as in Example 1 from lithium hydroxide monohydrate (Li raw material) containing 0.0025 mass % of magnetically attractable substances with respect to the amount of lithium contained. As a result, the amount of magnetically attractable substances in the Li raw material was decreased to 0.0015 mass % with respect to the amount of lithium contained. The Li raw material and a nickel composite oxide containing less than 0.015 mass ppm of magnetically attractable substances with respect to the nickel composite oxide were used to prepare a positive active material comprising a lithium-nickel composite oxide represented by $Li_{1.01}Ni_{0.82}Co_{0.15}Al_{0.03}O_2$. The amount of magnetically attractable substances in the thus obtained positive active material was measured and found to be 0.055 mass ppm.

In the Examples, the lithium hydroxide monohydrate in which the amount of magnetically attractable substances was 0.0007 mass % or less with respect to the amount of lithium contained in the lithium compound was used as a Li raw material, and the amount of magnetically attractable substances in the thus obtained positive active material was significantly reduced, such that the amount of magnetically attractable substances was less than 0.015 mass ppm with respect to the positive active material. In Example 3, although the amount of magnetically attractable substances in the nickel composite oxide was high, the amount of magnetically attractable substances in the positive active material was reduced. Moreover, in Comparative example 1, the amount of magnetically attractable substances in the Li raw material was high, and thus the amount of magnetically attractable substances in the thus obtained positive active material was also high.

As described above, the amount of magnetically attractable substances contained in a Li raw material, that is, a lithium compound for production of a positive active material for a nonaqueous electrolyte secondary battery, has a significant effect on the amount of magnetically attractable substances in a positive active material. Moreover, it is understood that a positive active material containing a low amount of magnetically attractable substances can be obtained by reducing the amount of magnetically attractable substances to 0.0007 mass % or less.

The invention claimed is:
1. A method for producing a lithium compound for production of a positive active material for a nonaqueous electrolyte secondary battery, whereby
   the lithium compound is either lithium carbonate, lithium hydroxide, a hydrate of lithium hydroxide, or a mixture of lithium hydroxide and its hydrate,
   an amount of magnetically attractable substances in the lithium compound is 0.0007 mass % or less with respect to an amount of lithium contained in the lithium compound through contact of a magnetized screen with the lithium compound and use of a magnetic separator for removing magnetically attractable substances, wherein the screen is magnetized by an electromagnet and particle diameter of the lithium compound ranges from 1 µm to 50 µm.

2. The method for producing a lithium compound according to claim 1, wherein the lithium compound is subjected to dry magnetic separation.

3. The method for producing a lithium compound according to claim 1, wherein a surface of the screen has a magnetic flux density of 1 tesla or more.

* * * * *